United States Patent [19]

Fateley

[11] Patent Number: 4,750,834
[45] Date of Patent: Jun. 14, 1988

[54] INTERFEROMETER INCLUDING STATIONARY, ELECTRICALLY ALTERABLE OPTICAL MASKING DEVICE

[75] Inventor: William G. Fateley, Manhattan, Kans.

[73] Assignee: D.O.M. Associates, Inc., Manhattan, Kans.

[21] Appl. No.: 106,913

[22] Filed: Oct. 5, 1987

Related U.S. Application Data

[63] Continuation of Ser. No. 816,821, Jan. 7, 1986, abandoned.

[51] Int. Cl.⁴ .............................. G01B 9/02; G01J 3/45
[52] U.S. Cl. ................................ 356/346; 250/237 G; 250/550; 350/356; 350/357
[58] Field of Search ................... 356/346; 250/237 G, 250/550, 330, 331, 334; 350/356, 357

[56] References Cited

U.S. PATENT DOCUMENTS

| | | | |
|---|---|---|---|
| 3,402,001 | 9/1968 | Fleisher | 350/150 |
| 3,484,722 | 12/1969 | Barker, Jr. et al. | 350/353 X |
| 3,563,663 | 2/1971 | Barringer | 356/346 |
| 3,578,980 | 5/1971 | Decker | 250/237 |
| 3,590,246 | 6/1971 | Menke | 250/237 G X |
| 3,813,142 | 5/1974 | Buhrer | 350/96 |
| 3,815,090 | 6/1974 | Muenchhausen | 340/146.3 |
| 3,859,515 | 1/1975 | Radcliffe, Jr. | 235/164 |
| 3,861,784 | 1/1975 | Torok | 350/162 |
| 3,969,699 | 7/1976 | McLaughlin | 340/146.3 |
| 3,982,227 | 9/1976 | Joynson et al. | 340/146.3 |
| 4,007,989 | 2/1977 | Wajda | 356/96 |
| 4,134,134 | 1/1979 | Lux | 358/280 |
| 4,193,691 | 3/1980 | Fjarlie | 356/330 |
| 4,283,113 | 8/1981 | Eden | 350/353 |
| 4,389,673 | 6/1983 | Despois et al. | 358/160 |
| 4,421,985 | 12/1983 | Billingsley et al. | 350/353 |

FOREIGN PATENT DOCUMENTS

| 75171 | 3/1983 | European Pat. Off. | 356/328 |
|---|---|---|---|
| 2197186 | 3/1974 | France . | |

OTHER PUBLICATIONS

Fateley, "Hadamard Transform Spectroscopy", Analytical Applications of FT-IR to Molecular and Biological Systems, Reidel, 1980, pp. 89-118.
Harwit et al., Hadamard Transform Optics, Academic, 1979.

(List continued on next page.)

Primary Examiner—Davis L. Willis
Assistant Examiner—Matthew W. Koren
Attorney, Agent, or Firm—Hovey, Williams, Timmons & Collins

[57] ABSTRACT

An improved interferometer is provided which is of simplified construction and gives enhanced, accurate interference analysis through provision of an alterable masking device located at the interference plane which facilitates rapid computer analysis of an interference pattern. The interferometer of the invention preferably includes a source of electromagnetic radiation, a beam splitter, a lens for convergence and interference of the beams, a masking device located at the region of beam convergence, and detection apparatus for receiving and analyzing radiation from the mask. The mask is preferably stationary and electrically alterable and advantageously includes a base along with separate, plural masking structures mounted on one base face with electrical connections coupled to the separate masking structures. The masking structures are formed of a crystalline or polycrystalline thermo or electro diachromatic substance such as vanadium dioxide which has different opacity characteristics to electromagnetic radiation upon selective application of electrical potential thereto. In use, electrical potential is applied to various subsets of the masking structures in a predetermined pattern so as to facilitate mathematical analysis of the generated interference patterns detected by the detection apparatus. The use of a masking device in the present invention allows the use of a small detector which thereby maximizes the signal-to-noise ratio of the detected interference pattern. The use of an electrically alterable mask avoids the need for selective physical repositioning of a masking device, and is specifically adapted for minicomputer control to achieve the most accurate, rapid results.

20 Claims, 1 Drawing Sheet

OTHER PUBLICATIONS

Harwit, "Hadamard Transform Analytical Systems", *Transform Techniques in Chemistry*, Plenum, pp. 173–197, 1978.

Marshall et al., "Fourier and Hadamard Transform Methods in Spectroscopy" *Analytical Chemistry*, vol. 47, No. 4, pp. 491A–504A, Apr. 1975.

Decker, Jr. "Hadamard-Transform Image Scanning", *Applied Optics*, vol. 9, No. 6, pp. 1392–1395, Jun. 1970.

Pratt et al., "Hadamard Transfer Image Coding", Proc. IEEE, vol. 57, No. 1, pp. 58–68, Jan. 1969.

Vanasse et al., "Selective Modulation Interferometric Spectrometer (SIMS) Technique Applied to Background Suppression", *Optical Engineering*, vol. 18, No. 4, pp. 403–408, 8/79.

INTERFEROMETER INCLUDING STATIONARY, ELECTRICALLY ALTERABLE OPTICAL MASKING DEVICE

This application is a continuation of application Ser. No. 816,821, filed Jan. 7, 1986, now abandoned.

BACKGROUND OF THE INVENTION

1. Field of the Invention

This invention relates to the field of optics and to an improvement of an interferometer useful for precise analytical determinations. More particularly, this invention relates in preferred forms to an interferometer incorporating an electrically alterable mask, a minicomputer and a detector which cooperatively facilitate the use of fast Fourier and Hadamard transforms or analogous mathematical multiplexing techniques to analyze electromagnetic radiation conforming to the laws of optics.

2. Description of the Prior Art

Interferometry has been known and used in the fields of physics and analytical chemistry for many years. A classical, simple interferometer consists basically of a light source, a light beam collimating device, beam splitter, two reflecting mirrors, a focusing lens, and a viewing surface. In operation, a beam of light from a light source strikes the beam splitter, for example a parallel faced optical flat with a thin detective coating one one surface, or Fresnel biprism, and is thereby divided into two separate, substantially identical beams of light. These two beams are reflected and directed by the reflecting mirrors such that the two beams become parallel to one another as they strike the focusing lens. The focusing lens is typically convex and causes the emerging beams to follow generally converging paths. The converging paths in turn cause the beams to electromagnetically interfere at an interference plane (this is the plane located at the focal point of the lens and perpendicular to the axis of the lens). For a visible light, the beams produce a bright region at the interference plane where they constructively interfere; the beams produce a darker region at the interference plane where they destructively interfere.

The pattern of interference observable on the interference plane is distinctive and characteristic of the electromagnetic radiation source and of any differences in refraction of the separate parallel beams. Because of this phenomenon, the interferometer is very useful, for example, in analyzing concentrations of gases dissolved in other gases or liquids, or for determining the spectral composition of a particular light beam. One difficulty with classical interferometry is that the interference pattern must be observed directly on the interference plane in real time. This makes long term, detailed analysis and measurement of the interference pattern difficult and tedious.

One improvement to classical interferometry in recent years is the development of techniques to produce an interferogram. An interferogram is a recording of an interference pattern from an interferometer which can be analyzed separately. An interferogram can be produced by placing photographic film at the interference plane. The film is exposed to the interference pattern, removed from the interferometer, developed, and then analyzed. While this is an improvement over classical interferometry, it is also time consuming and tedious.

The photographic film technique for producing interferograms can be used to analyze infrared radiation, but the same disadvantages of time-consuming and tedious analysis are present with infrared analysis as with visible light analysis. Additionally, the photographic technique is not readily adaptable to analysis by computer.

A very recent development in interferometry involves placing a solid state silicon photodiode array at the interference plane; see the article entitled "Fourier Transform Spectrometer With a Self-Scanning Photodiode Array" by T. Okamoto et al., at pages 269–273 of *Applied Optics*, Vol. 23, No. 2, Jan. 15, 1984. The photodiode array detects the bright regions in the interference pattern and converts these into electrical analog signals. The photodiode array is electrically coupled with a minicomputer which scans the array and converts the analog signals into digital signals for digital processing. The photodiode array permits quantitative detection of the interference pattern, and the microcomputer permits quick processing of the interference pattern data to mathematically construct an interferogram illustrative of the electromagnetic frequencies present and also their amplitudes. An interferogram so produced can be displayed on a cathode ray tube, X-Y plotter or stored on magnetic discs, magnetic tape, or the like.

The photodiode arrangement discussed above is useful for visible spectrum light, but presents problems when applied to infrared radiation. Analysis of infrared radiation presents special problems because known detectors are subject to extraneous infrared radiation which introduces "noise" into the infrared signal under study. Detectors such as cooled mercury-cadmium-telluride detectors have been developed to minimize the effect of unwanted infrared "noise." These detectors are expensive and not readily adaptable for use in a densely packed array.

A photodiode array similar to that discussed above but sensitive to infrared might be constructed but each photodiode would necessarily be a receptor of unwanted infrared "noise." The "noise" produced by such an array could be so great as to effectively obscure the infrared signal under analysis. If the number of photodiodes in the array is reduced, the noise is reduced proportionately, but then the resolution of the array is also reduced proportionately and again the detection of the infrared radiation under analysis is obscured.

SUMMARY OF THE INVENTION

The problems outlined above are in large measure solved by an interferometer in accordance with the present invention. That is to say, the interferometer hereof provides high resolution of interference patterns produced by electromagnetic radiation conforming to the laws of optics and provides an extremely high signal to noise ratio for analysis of interference patterns, especially those produced by infrared radiation.

The interferometer in accordance with the present invention preferably includes a source of electromagnetic radiation, a radiation collimating device, a beam splitter, an arrangement for causing the split beams to follow parallel paths, a focusing device for causing the parallel beams to follow converging paths and produce an interference pattern at an interference plane, an alterable optical mask located at the interference plane, and a detecting device to receive at least a portion of the interference pattern from the mask. Preferably, the mask is electrically alterable and operably coupled to a minicomputer which is also coupled to receive electrical input signals from the detecting device.

In particularly preferred forms, a single source of light is employed which is split and caused to interfere and produce an interference pattern at an interference plane. An electrically alterable optical mask is located at the interference plane, so that the interfering beams impinge thereof. The mask can be selectively altered to transmit or reflect all or portions of the impinging interference pattern. A detecting device then receives the transmitted electromagnetic rays. The detecting device includes a focusing arrangement which concentrates the mask-transmitted pattern by way of a mirror or optical fibers to a convex focusing lens which further concentrates the pattern onto a small detector such as a photodiode or a cooled mercury-cadmium-telluride detector. The detector is electrically coupled with a minicomputer and provides analog signals according to the radiation received.

The minicomputer is electrically coupled to the mask and also provides output signals to selectively alter the mask according to a predetermined program generated by Hadamard mathematics or some other means of encodement. The minicomputer stores in memory the detector signal data utilizing a Hadamard or another mathematical transform on the recorded data corresponding to the various mask alteration patterns and then analyzes the data to mathematically reconstruct the interference pattern. This interference pattern is then Fast Fourier transformed to give the spectral features of the source and/or source and sample. A combination of Hadamard and Fourier transforms or other analogous mathematical techniques may be used to obtain multiplexing techniques.

DESCRIPTION OF THE PREFERRED EMBODIMENTS

Figure 2:
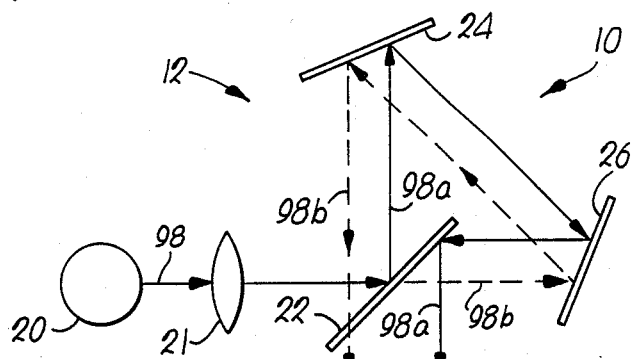
FIG. 2 is a diagrammatic representation of an interferometer according to the present invention.

Referring now to the drawings, an interferometer device 10 according to the present invention broadly includes a beam assembly 12, a mask 14, a detector collection assembly 16 and a minicomputer 18. FIG. 2 schematically illustrates a preferred beam assembly 12 which includes radiation source 20, a collimating device 21 such as a conventional lens, beam splitter 22, planar mirrors 24 and 26, and lens 28.

Collimated radiation from source 20 is represented generally in the drawing, and can be virtually any source of electromagnetic radiation conforming to the laws of optics, depending on the purpose of the device. For example, in a conventional interferometer, an incandescent lightbulb is fixed within the device. A fixed infrared source could be used also. Additionally, the device 10 might be used to determine the frequency and amplitude composition of an external radiation source in which case the source is not part of the device 10 but rather is the subject of the analysis. Beam splitter 22 is preferably in the form of a planar optical flat with an appropriate thin film dielectric coating of instrument quality which is constructed so that part of an incident beam of electromagnetic radiation is reflected and part is transmitted. Other means commonly and conventionally used in interferometry to split an incident beam including, for example, a Fresnel biprism, or a pair of diffraction slits could also be employed.

Mirrors 24 and 26 are instrument quality planar full reflecting mirrors. Lens 28 is an instrument quality convex lens. These components are conventional and many alternative components and arrangements are known. Preferably these components are precisely mounted and fixed within a protective housing (not shown) according to well known techniques for high quality optical instruments.

Mask 14 is located at the interference plane of the device which is that plane located at the focal point of lens 28 and perpendicular to the axis of lens 28. Mask 14 is preferably of the type disclosed and discussed in co-pending application Ser. No. 613,711 which is hereby incorporated by reference. Mask 14 is designed so that different patterns of reflective and transmissive regions can be produced. Such an arrangement is possible with a manually alterable mask assembly. Preferably however, mask 14 is stationary and electrically alterable in accordance with the aforementioned patent application.

Mask 14 (FIG. 1) is preferably constructed to include a rectangular, flat, thin substrate 30 which is physically stable, electrically insulative, has a low thermal conductivity and is highly transmissive to optical-type radiation. The preferred material for substrate 30 is sapphire, although high purity silicon wafer, alkali halides and other transparent materials satisfying the mentioned design criteria may also be used. The major face of substrate 30 is designated by numeral 32.

Figure 1:
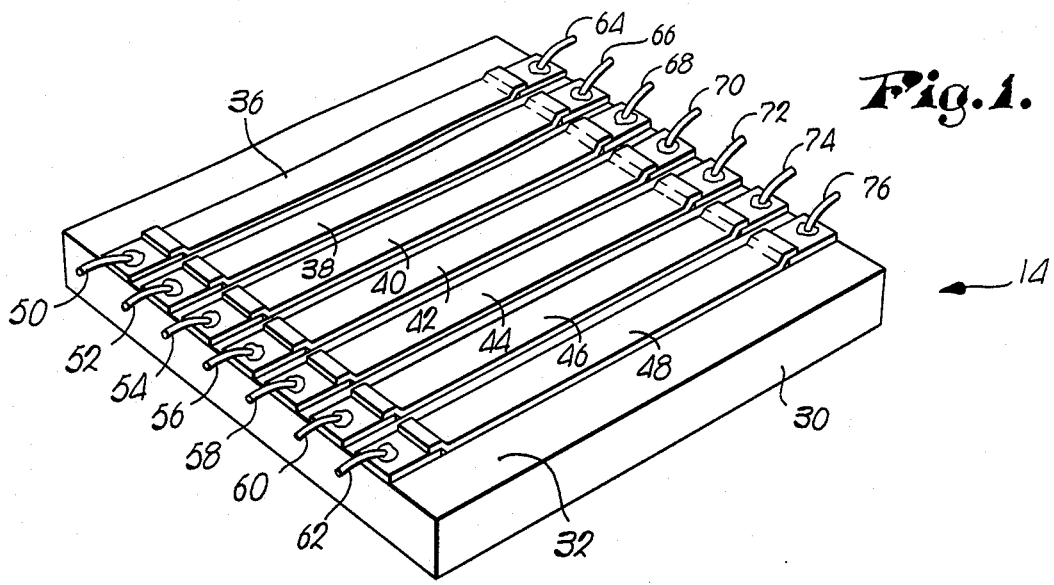
FIG. 1 is a perspective view of a mask used in a device according to the present invention.

Masking structures 36, 38, 40, 42, 44, 46 and 48 are located on face 32 of substrate 30. Structures 36, 38, 40, 42, 44, 46, 48 are rectangular, elongate, spaced apart and parallel to one another, and are composed of a thermal or electro diachromic material selected from the group consisting of the oxides of vanadium, niobium and silver tetracyanoquinone or copper tetracyanoquinone. Electrical wires 50, 52, 54, 56, 58, 60, 62, 64, 66, 68, 70, 72, 74 and 76 are connected one each to the respective ends of structures 36, 38, 40, 42, 44, 46, 48 as illustrated in FIG. 1.

Structures 36–48 exhibit a diachromatic effect in that they are relatively transmissive initially but rapidly change to a relatively reflective and opaque state when subjected to electrical potential. Structures 36–48 rapidly revert to the transmissive state when electrical potential is removed.

Detector collection assembly 16 includes instrument quality mirror 78, lens 80, and detector 82 as illustrated in FIG. 2. Mirror 78 presents a generally frustoconical upper reflective surface 84 and a generally cylindrical lower reflective surface 86, and an inlet end 88 and outlet end 90. Convex lens 80 is of instrument quality and is located adjacent end 90 with the optical axis of lens 80 aligned with that of mirror 78.

Detector 82 is preferably a cooled mercury-cadmium-telluride, TGS(triglycinesulfate), DTGS (deuterotriglycine sulfate), or theremocouple detector when device 10 is used with infrared radiation, and is preferably a photodiode when device 10 is used with visible light. The detecting surface 92 of detector 82 is located at the focal point of lens 80. Detector 82 is the type which produces electrical analog signals corresponding to surface incident radiations and is electrically coupled with minicomputer 18 by minicomputer input signal cable 94.

Minicomputer 18 is of the conventional type capable of receiving input data from output signals, storing data in memory, processing that data according to a program stored in memory, and producing output signals according to the program. As can be appreciated, a wide variety of minicomputers are economically available which satisfy the required criteria. Minicomputer 18 is electrically coupled with mask 14 by output signal cable 96 which includes wires 50–76 when the mask configuration of FIG. 1 is used.

In operation, a beam 98 of electromagnetic radiation emerges from source 20, is collimated by lens 21 and strikes beam splitter 22 which splits beam 98 into two substantially identical beams 98a and 98b. Mirrors 24 and 26 in cooperation with beam splitter 22 conventionally direct the paths of beams 98a and 98b so that these beams are parallel to one another as they enter lens 28. Beams 98a and 98b are refracted by lens 28 so that the various frequency components of the beams follow generally and relatively converging paths as they emerge from lens 28 so that beams 98a and 98b interfere and produce an interference pattern on mask 14 which occupies the interference plane. If for example a masking arrangement illustrated in FIG. 1 is used for mask 14, those structures 36–48 which are deenergized by electrical potential are generally transmissive to the interference pattern, as is substrate 30. On the other hand, those structures 36–48 which are energized by electrical potential from wires 50–76 present a generally opaque and reflective surface to the interference pattern.

The electromagnetic radiation of that portion of the interference pattern which impinges upon those structures 36–48 which are unenergized and therefore transmissive is transmitted through mask 14 to enter mirror 78 at inlet end 88. The radiation of the interference pattern is then reflected and concentrated by the surfaces 84, 86 to emerge and enter lens 80. Lens 80 focuses and concentrates the radiation of the interference pattern onto surface 92 of detector 82.

Detector 82 then produces electrical analog signals corresponding to the electromagnetic radiation allowed to impinge on surface 92 according the design of detector 82. These electrical signals are in turn transmitted over signal cable 94 as input signals to minicomputer 18.

Minicomputer 18 analyzes the input signals from detector 82 and stores the data from that analysis in memory according to a program also in memory. Minicomputer 18 next sends output signals over cable 96 which includes wires 50–76 to mask 14 to change the pattern of transmissive zones configured on mask 14 by selectively applying electrical potential to structures 36–48. The reconfiguration of mask 14 by minicomputer 18 selectively occurs in a predetermined manner according to the minicomputer 18 program utilizing mathematical encodements.

The new portion of the interference pattern transmitted through mask 14 is then concentrated and focused by mirror 78 and lens 80 to detector 82 in a manner similar to that described above with the initial mask 14 configuration. Minicomputer 18 receives the new input signals over cable 96 from detector 82 and analyzes and stores the data from those input signals.

This sequence of masking pattern alteration and signal data collection is repeated for the number of times called for by the particular multiplexing technique incorporated within the minicomputer 18 program. After the sequence is complete, the program in minicomputer 18 then causes the stored data to be analyzed from which the interference pattern is mathematically reconstructed. The reconstructed interference pattern can be stored in memory, transferred to other data storage devices such as magnetic discs or magnetic tape, or displayed on a cathode ray tube, X/Y plotter or the like. The sequence of data collection and interference pattern reconstruction occurs so rapidly that an observer using device 10 can observe the reconstructed interference pattern on a cathode ray tube very shortly after the minicomputer program is initiated. Because of the rapid reconstruction, an observer sees the reconstructed interference pattern in quasi-real time.

Figure 3:
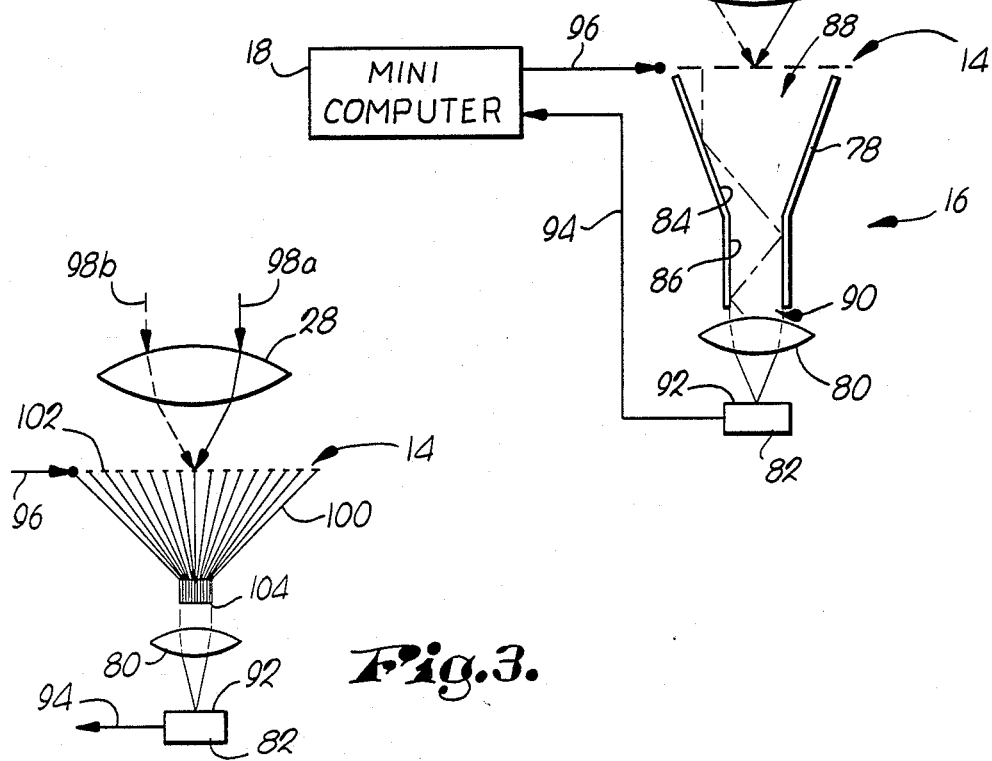
FIG. 3 is a partial diagrammatic representation of a second embodiment of a device according to the present invention.

A second embodiment of the present invention is illustrated in FIG. 3. Inasmuch as most of the components of the second embodiment are similar to those of the first embodiment, similar components are numbered the same and no further discussion of the similar components is provided. The primary difference between the second embodiment and the first embodiment is that mirror 78 of the first embodiment is replaced by a plurality of optical fibers 100 in the second embodiment. The number of fibers is determined so that there is a single optical fiber corresponding to each "window" of mask 14. To illustrate from FIG. 1, a "window" is formed when structures 38–46 are energized by wires 52–60 and 66–74. When this occurs structures 38–46 so energized become opaque but structures 36 and 48 being deenergized remain transmissive. Thus, with the FIG. 3 embodiment, sets of optical fibers corresponding to each of the 7 "windows" make up the bundle of optical fibers 100. The ends 102 of optical fibers 100 which correspond to the "windows" are located adjacent mask 14 and are the input ends. The other ends 104 of optical fibers 100 are the output ends and are bundled closely together so that optical fibers 100 are aligned parallel to one another. End 104 is located adjacent lens 80.

In operation, optical fibers 100 receive the electromagnetic radiation of the interference pattern transmitted through mask 14 at ends 102. Fibers 100 then transmit that radiation to ends 104 where the radiation emerges to impinge on lens 80. Thus, optical fibers 100 serve to transmit and concentrate the electromagnetic radiation of the interference pattern from mask 14 to lens 80 and in this regard serve the same function as mirror 78 of the first embodiment.

The advantages of a device constructed according to the present invention are substantial. The focusing arrangement allows the use of a very small detector, thereby allowing analysis of electromagnetic radiation, especially infrared, with a very low signal to noise ratio. The use of the detector and minicomputer in combination with the mask permits the application of mathematical multiplexing techniques to reconstruct and analyze the interference pattern. The device permits a large number of data measurements corresponding to a large number of mask pattern permutations thus providing detailed resolution of a reconstructed interference pattern even though only one small detector is used. The device also permits analysis in quasi-real time with computer aided analysis and reconstruction, and avoids the time-consuming and tedious photographic film technique to produce an interferogram while at the same time provides an interferogram subject to detailed analysis.

Those skilled in the art will appreciate that many variations of the device herein disclosed are possible which are contemplated by the principles of the present invention. For example, only two embodiments are illustrated for concentrating and focusing electromagnetic radiation of an interference pattern from a masking device to a detector; the invention comprehends equivalent techniques however. Additionally, the beam splitter herein disclosed is one type used in classical interferometry; there are a wide variety of such techniques different from the one exemplified herein which cause two or more beams to interfere and produce an interference pattern. A simple seven slot masking device is illustrated; however the number of slots can be increased substantially. For example, the configuration illustrated in FIG. 1 could be 255 "windows." A configuration providing many more "windows" is possible if higher resolution of the interference pattern is desired. The principles of the present invention also contemplate the advantageous use of a manually alterable mask rather than one electrically alterable as herein disclosed, although the electrically alterable mask is preferred because of its ready adaptability for computer control.

I claim:

1. An interferometer comprising:
   means for creating a pair of parallel beams of electromagnetic radiation;
   means for causing said beams to interfere and produce an interference pattern;
   a masking device located at a region of interference of said beams for impingement of at least a portion of said interference pattern thereon;
   detecting means associated with said masking device for receiving at least a portion of said interference pattern therefrom,
   said masking device including structure for selectively directing certain portions of said interference pattern to said detecting means, while preventing other portions of said interference pattern from being directed to said detecting means,
   there being means for selective alteration of said device for varying the portions of said pattern directed to, and prevented from being directed to, said detecting means,
   said masking device having—
     a plurality of masking structures electrically separate from one another; and
     means for effecting electrical connections with each of said structures,
     each of said electrical structures including a material electrically coupled with said electrical connection means, said material having different optical characteristics to radiation impinging thereon at correspondingly different electrical potentials applied to said electrical connection means.

2. The apparatus as defined in claim 1, said detecting means including means for providing an electrical output signal in response to detection of said radiation.

3. The apparatus as defined in claim 2, said detecting means further including means for analyzing said output signal, and means coupling said analyzing means with said output signal.

4. The apparatus as defined in claim 3, said analyzing means including means for providing a second output signal in response to said output signal; and means coupling said second output signal with said electrical connection means for selectively applying electrical potential to certain of said electrical connection means.

5. The apparatus as defined in claim 1, said device including base means generally transparent to said electromagnetic radiation, said base means having two generally opposing parallel faces, said structures being supported on at least one of said faces.

6. The apparatus as defined in claim 5, said structures being generally rectangular and elongate, said structures being generally parallel to one another.

7. The apparatus as defined in claim 1, said structures being formed of a material exhibiting a diachromatic effect when electrically stimulated.

8. The apparatus as defined in claim 1, said structures being formed of a material selected from the group consisting of vanadium oxide, vanadium dioxide, divanadium trioxide, diniobium pentoxide, silver sulfide, silver tetracyanoquinone, and copper tetracyanoquinone.

9. The apparatus as defined in claim 1, said interference-causing means including a lens.

10. The apparatus as defined in claim 1, said beam-creating means including a source of electromagnetic radiation, and means for splitting radiation emanating from said source into said pair of substantially identical respective beams.

11. The apparatus as defined in claim 10, said radiation-splitting means comprising an optical beam splitter.

12. The apparatus as defined in claim 11, said detecting means including a photodiode.

13. The apparatus as defined in claim 11, said detecting means including cooled mercury-cadmium-telluride.

14. The apparatus as defined in claim 11, said detecting means including an infrared detector.

15. The apparatus as defined in claim 1, said detecting means including focusing means for receiving said portion of said interference pattern directed from said masking device, and for focusing said received portions at a focal region, there being a detector located at said focal region.

16. The apparatus as defined in claim 15, said focusing means including a mirror and a lens, said mirror being located for directing said received portion to said lens, and said lens being located for directing said portion from said mirror to said detector.

17. The apparatus as defined in claim 15, said focusing means including a plurality of optical fibers having input and output ends and located and operable for receiving at said input ends said received portion from said masking device and directing said received portion towards said detector, and a lens located adjacent said output ends of said fibers and operable for directing said received portion therefrom to said detector.

18. The apparatus as defined in claim 1, said electromagnetic radiation including infrared radiation.

19. The apparatus as defined in claim 1, said electromagnetic radiation including visible light and infrared radiation.

20. An interferometer, comprising:
    means including a source of electromagnetic radiation for creating a pair of parallel beams of said electromagnetic radiation;
    means for causing said beams to interfere and produce an interference pattern;
    a stationary masking device located at a region of interference of said beams for impingement of at least a portion of said interference pattern thereon,
    the path lengths of said beams from said source to said masking device being equal;

detecting means associated with said masking device for receiving at least a portion of said interference pattern therefrom,
said stationary masking device presenting a plurality of stationary zones, there being means operatively coupled with said zones for selectively applying an electric potential thereacross in order to vary the optical characteristics of respective zones to the electromagnetic radiation impinging thereon.

* * * * *